April 23, 1940.  V. J. CHAPMAN  2,198,472
OSCILLATOR MECHANISM
Filed Sept. 16, 1938
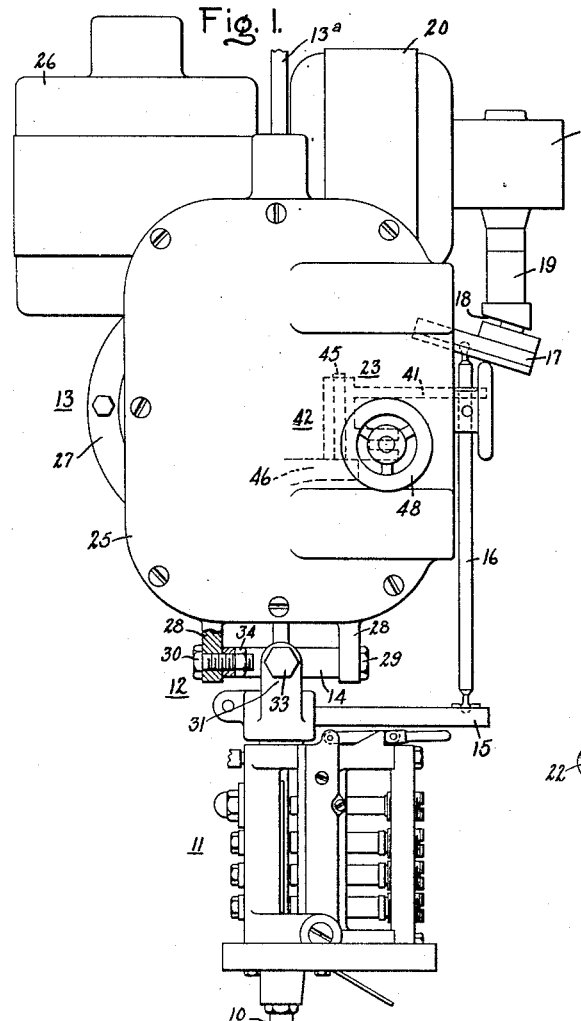
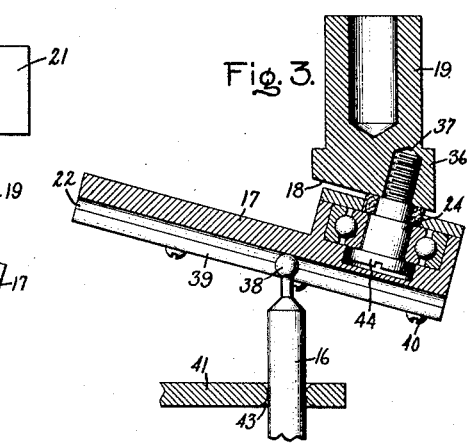
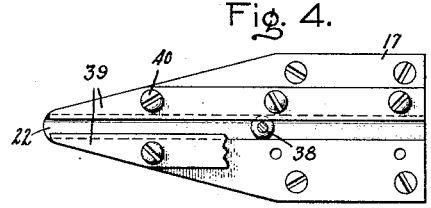
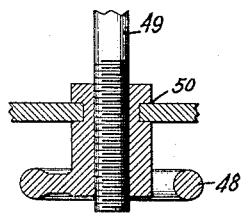
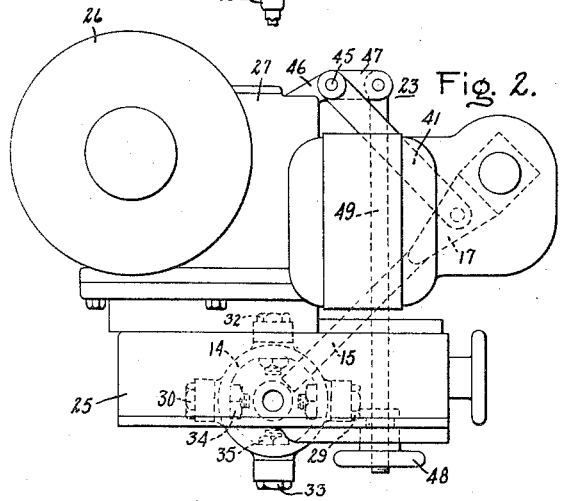
Inventor:
Verni J. Chapman,
by Harry E. Dunham
His Attorney.

Patented Apr. 23, 1940

2,198,472

UNITED STATES PATENT OFFICE 2,198,472

OSCILLATOR MECHANISM

Verni J. Chapman, Schenectady, N. Y., assignor to General Electric Company, a corporation of New York Application September 16, 1938, Serial No. 230,264

8 Claims. (Cl. 74—60)

This invention relates to arc welding apparatus and more particularly to welding apparatus provided with an electrode oscillating mechanism.

In order to secure the proper deposition of metal, it is frequently necessary to oscillate the electrode across or along the seam being welded. Accordingly, it is an object of my invention to provide means for oscillating the electrode tip in the desired direction.

A further object of my invention is to provide a pivotal mounting for the welding nozzle and contact mechanism, if used, which cooperates with the oscillating mechanism to oscillate the electrode tip.

It is also an object of my invention to provide an oscillating mechanism which is simple and efficient in operation and economical to manufacture and use.

Further objects and advantages of my invention will become apparent as the following description proceeds and the features of novelty which characterize my invention will be pointed out with particularlity in the claims annexed to and forming a part of this specification.

For a better understanding of my invention, reference may be had to the accompanying drawing in which Fig. 1 is a side elevation of welding apparatus embodying my invention; Fig. 2 is a plan view of the apparatus shown in Fig. 1; Fig. 3 is an enlarged view, partly in section, of a detail of my invention; Fig. 4 is a view of a portion of the apparatus disclosed in Fig. 3; and Fig. 5 is an enlarged sectional view of the adjusting means illustrated in Figs. 1 and 2.

The electrode nozzle 10 and contact mechanism 11, if used, are supported by a pivotal mounting or joint 12 from the welding head 13. The pivotal joint 12 comprises a ring 14 supported from the welding head about a diametrical axis thereof. This ring in turn supports nozzle 10 and contact mechanism 11 about a second diametrical axis of the ring located at right angles to the first referred to diametrical axis. An arm 15 is angularly disposed between the intersecting axes of the pivotal mounting and is connected by a vertical rod 16 to a follower block or cam follower 17 mounted on the oblique or cam surface 18 of a shaft 19 operatively connected to a motor 20 through a speed changing device 21. The follower block 17 is provided with a groove 22 along which the connecting rod 16 may be adjusted by a mechanism indicated by the numeral 23. The follower block is journaled on a pin 24 whose axis is at right angles to the oblique surface 18 of the shaft 19. As the shaft 19 rotates, the follower block 17 moves up and down imparting a vertical oscillation to the connecting rod 16 and the arm 15 attached to the pivotal mounting 12. The pivotal mounting is so constructed that rotation about either of the axes of the mounting may be prohibited and by making this adjustment the oscillation imparted to the electrode nozzle and contact mechanism may be selected so as to be in the direction of welding or at right angles thereto.

The electrode feeding mechanism 13 includes a plurality of feed rolls (not shown) enclosed within the casing 25 for feeding the welding electrode 13a to the welding arc. An electric motor 26 is provided for imparting motion to the feeding mechanism through a speed changing device 27.

The current collecting mechanism illustrated in Fig. 1 is shown, described and claimed in my copending application, Serial No. 230,266, filed concurrently herewith, and assigned to the same assignee as the present invention.

The ring 14 of the pivotal mounting is supported between ears 28 depending from the feeding mechanism by diametrically oppositely disposed bolts 29 and 30 provided with nuts 34 so that the ring 14 may be loosely or rigidly secured between ears 28 by loosening or tightening the bolts, respectively. The ends of the bolts may be roughened to prevent the nuts loosening and falling off the bolts. A yoke 31 is pivotally supported from ring 14 about a diametrical axis thereof preferably located at right angles to the first mentioned axis by means of a second set of diametrically oppositely disposed bolts 32 and 33 which are also adjustable.

When the bolts 29 and 30 are tightened so that there can be no rotation about the axis defined by bolts 29 and 30, the contact making mechanism and the nozzle block may be swung about the other axis, as best seen in Fig. 2, assuming that bolts 32 and 33 are loose enough to permit rotation. Under these conditions, it will be apparent that if vertical motion is imparted to arm 15 the contact making mechanism and nozzle block will be swung about the axis defined by bolts 32 and 33. Conversely, if bolts 32 and 33 are tightened while bolts 29 and 30 are loosened, oscillation will be possible about the other diametrical axis. The arm 15 is preferably attached to yoke 31 in such a position that the angle between the diametrical axes is bisected in order to provide an equal turning movement about either axis.

In order to impart a vertical motion to arm

15 I have provided means to reciprocate connecting rod 16, as mentioned about. Shaft 19 is provided with an enlarged portion 36 having a surface 18 which is oblique with respect to the axis of the shaft 19. Pin 24 is threaded at one end to engage a tapped bore 37 in the portion 36 of shaft 19.

The follower block 17 is journaled to the pin 24 by any suitable means. In the arrangement illustrated in Fig. 3 ball bearings are employed. In the embodiment illustrated herein, the under side of the follower block 17 is provided with curved or rounded groove 22 to receive the substantially spherical head 38 of the connecting rod 16. The head 38 is retained within the groove 22 by means of retaining strips 39 suitably secured to the follower block 17 as by means of screws 40. The groove 22 may be formed in any desired manner and shape, it being necessary only to provide a groove which will slidingly retain the upper end of the connecting rod 16. The lower end of the connecting rod 16 is connected to the arm 15 by means of a ball and socket joint as illustrated in Fig. 1. The connecting rod 16 is prevented from moving in a horizontal direction by the above-mentioned ball and socket joint and also by the upper arm 41 of the bell crank lever 42 which is part of the adjusting mechanism 23, the connecting rod 16 passing through a hole 43 in the outer end of the upper arm 41. As a result of these restrictions against horizontal movement of connecting rod 16, it will be apparent that follower block 17 will be prevented from rotating about the shaft 19 as a center and will be confined to movement in a plane determined by the rod 16 and the groove 22.

It will be noted that the center of the head 44 of pin 24 lies on the axis of the shaft 19. However, the opposite end of pin 24 is offset from the axis of the shaft 19 and describes a circle about the axis of shaft 19 as the shaft is rotated. Thus, a line representing the axis of pin 24 will always intersect the axis of rotation of the shaft and the motion may be thought of as generating an inverted cone having its apex at the center of the head 44 of the pin 24. In the position shown in Fig. 3, the free end of the follower block 17 is shown in its uppermost position. If the shaft 19 is rotated half a turn, pin 24 will slant to the left instead of to the right of the shaft 19. Since the follower block 17 must always be perpendicular to pin 24 it follows that during the half revolution the follower block 17 will be caused to move from the position shown in Fig. 3 to its lowest position. Thus, the rotation of shaft 19 is translated to a vertical motion of the rod 16.

The amplitude of the vertical movement of connecting rod 16 depends upon the distance of the head 38 from the center line of the shaft 19. Thus, if the apparatus is adjusted so that the head 38 is placed directly beneath the head 44 no vertical motion will be transmitted to the rod 16 while the maximum vertical motion will be obtained when head 38 is moved to the extreme outer end of groove 22.

Means to adjust the position of the rod 16 with respect to the groove 22 has been provided. The above-mentioned bell crank lever 42 is pivotally supported by means of a pin 45 from a bracket 46 suitably secured to the wall of the speed changing device 27. The lower arm 47 of the bell crank lever 42 is operatively connected to an adjusting wheel 48 by means of a rod 49. The hub of the adjusting wheel 48 is provided with a groove 50 adapted to loosely fit within a slot cut in the cover of the casing 25. The fit is loose enough to permit rotation of the handle 48. The hub of the handle 48 is provided with a threaded bore adapted to engage threads on the outer end of the adjusting rod 49. It will be apparent that as the adjusting wheel 48 is turned in one direction the adjusting rod 49 will be drawn outwardly, thereby causing clockwise movement of the lever 47 about the pin 45. Consequently, the upper arm 41 of the lever 42 will cause rod 16 to move outwardly toward the end of the follower block 17 as will best be seen by reference to Fig. 2. Conversely, if the wheel 48 is turned in the opposite direction, the reverse sequence will take place.

In order to vary the frequency of the oscillations I contemplate any suitable means for varying the speed of rotation of shaft 19, such as providing the motor 20 with speed adjusting means.

It will be obvious to those skilled in the art that other arrangements may be substituted for the grooved follower block described above. For example, a smooth surfaced follower block or cam plate might be substituted for the grooved follower block 17 and the upper end of connecting rod 16 might be provided with a cam follower and a spring operating to bias the cam follower into engagement with the cam plate. With such an arrangement, as the cam plate moves downwardly the connecting rod will be reciprocated in the downward direction but as the cam plate is lifted by the operation of the shaft 19 the spring will cause the connecting rod 16 to be moved upwardly also.

It will also be obvious that the follower block may be journalled to the shaft at an angle with respect to the shaft in other ways than described above. For example, I may journal the follower block on the bent portion of a bent shaft, or a bearing may be supported on the shaft so that the center line of the bearing is at an angle with respect to the axis of rotation of the shaft and the follower block may be supported on the bearing. It will also be obvious that the end of the shaft carrying the follower block may have any desired shape so long as the pin 24 is secured to the shaft at an angle with respect to the axis of rotation. It will also be obvious that my invention may be applied to gas welding apparatus.

While I have shown a particular embodiment of my invention in connection with an electric arc welding apparatus, I do not desire my invention to be limited to the particular construction shown and described and I intend in the appended claims to cover all modifications within the spirit and scope of my invention.

What I claim as new and desire to secure by Letters Patent of the United States is:

1. Welding apparatus, including a pivotal mounting, an arm associated with said mounting, a rotatable shaft having an oblique surface with respect to its axis of rotation, means to rotate said shaft, and means including a member disposed in engagement with said oblique surface and arranged for pivotal movement with respect thereto, said member cooperating with said oblique surface and said arm to change the rotary motion of said shaft to a reciprocating motion of said arm for oscillating said mounting.

2. Welding apparatus including a pivotal mounting, an arm associated with said mounting, a rotatable shaft, means to rotate said shaft, a pin attached to one end of said shaft at an angle with respect to the axis of rotation of said shaft, a follower block journaled on said pin, and means interposed between said follower block and said arm for transmitting motion to said arm.

3. Welding apparatus including a pivotal mounting, means for oscillating said mounting about an axis thereof, said means including a rotatable shaft having an end surface which is oblique with respect to its axis of rotation, means for rotating said shaft, a pin attached to said shaft perpendicularly to said oblique surface, a follower block journaled on said pin, and means extending between said mounting and said follower block for transmitting the motion of said block thereto.

4. Welding apparatus including a pivotal mounting, means for oscillating said mounting about an axis thereof, said means including a rotatable shaft having an end surface which is oblique with respect to its axis of rotation, means for rotating said shaft, a pin attached to said shaft perpendicularly to said oblique surface, a grooved follower block journaled on said pin, an arm extending from said mounting, means including a connecting rod slidably supported at one end in the grooved portion of said follower block and at the other end by said arm, and adjusting means associated with said rod for moving said rod along the grooved portion of said follower block to vary the amplitude of oscillation of said mounting.

5. Welding apparatus including a support, and a pivotal mounting comprising a first member pivotally supported from said support about an axis of said first member, a second member adapted to be attached to a device to be oscillated and pivotally supported from said first member about a second axis of said first member, said axes being angularly disposed with respect to each other, means associated with said mounting for preventing oscillation about one of said axes while permitting oscillation about the other of said axes, and means to establish oscillation about said other axis including a rotatable shaft having at one end thereof a surface which is oblique with respect to the axis of rotation of said shaft, means for rotating said shaft, a pin attached to said shaft perpendicularly to said surface, a grooved follower block journaled to said pin, an arm extending from said second member angularly disposed between said axes, a connecting rod slidably supported at one end in said groove and supported at the other end by said arm, and adjustable means associated with said rod for moving said rod along said groove for adjusting the amplitude of oscillation.

6. The combination of a shaft having an end surface which is oblique with respect to the axis of said shaft, means for rotating said shaft, a pin attached to said shaft perpendicularly to said surface, a follower block journaled to said pin, said follower block having a groove in a surface thereof, a member to be reciprocated having a portion thereof in said groove, and means for confining said member for movement in a predetermined plane.

7. A pivotal mounting adapted to permit the oscillation of an object supported by said mounting about one of two axes comprising a support, a first member pivotally supported from said support about an axis of said first member by a first pair of diametrically oppositely disposed means, a second member pivotally carried by said first member about a second axis thereof by a second pair of diametrically oppositely disposed means, said axes being at an angle with respect to each other and each pair of means being axially adjustable for selectively permitting or restraining oscillation of said object about the respective axes.

8. In combination, a shaft having an end surface which is oblique with respect to the axis of said shaft, means for imparting rotation to said shaft, a pin attached to said shaft perpendicular to said surface, a follower block journaled to said pin, a surface of said block having a longitudinally extending groove, a member to be reciprocated having a portion thereof movably secured in said groove, adjustable means associated with said member for moving said member along said groove in order to adjust the amplitude of reciprocation of said member, and means for confining said member for movement in a predetermined plane.

VERNI J. CHAPMAN.